US007539605B2

(12) United States Patent
Rahmes et al.

(10) Patent No.: US 7,539,605 B2
(45) Date of Patent: May 26, 2009

(54) GEOSPATIAL MODELING SYSTEM PROVIDING SIMULATED TREE TRUNKS FOR GROUPS OF TREE CROWN VEGITATION POINTS AND RELATED METHODS

(75) Inventors: Mark Rahmes, Melbourne, FL (US); Anthony O'Neil Smith, Gainesville, FL (US); Josef Allen, Melbourne, FL (US); Stephen Connetti, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 407 days.

(21) Appl. No.: 11/530,972

(22) Filed: Sep. 12, 2006

(65) Prior Publication Data

US 2008/0133195 A1 Jun. 5, 2008

(51) Int. Cl.
*G06G 7/48* (2006.01)
*G06T 17/50* (2006.01)
(52) U.S. Cl. ................... 703/6; 47/23.1; 702/5
(58) Field of Classification Search .............. 703/6, 703/11; 702/5; 359/462; 47/23.1
See application file for complete search history.

(56) References Cited

U.S. PATENT DOCUMENTS 6,654,690 B2  11/2003  Rahmes et al. ............... 702/5

2005/0117215 A1  6/2005  Lange ........................ 359/462

OTHER PUBLICATIONS

Pyysalo et al., *Reconstructing Tree Crowns from Laser Scanner Data for Feature Extraction*, ISPRS Commission III, Symposium 2002 Sep. 9-13, 2002, Graz, Austria, pp. B-218 ff (4 pages).
Popescu, *Measuring Individual Tree Crown Diameter With Lidar and Assessing its Influence on Esitmating Forest Volume and Biomass*, International Archives of Photogrammetry, Remote Sensing and Spatial Information Sciences, vol. XXXVI—8/W2 influence on estimating forest volume and biomass, In: ScandLaser Proceedings, pp. 125-133.
Haala et al., *Combination of Terrestrial Laser Scanning with High Resolution Panoramic Images for Investigations in Forest Applications and Tree Species Recognition*, Proceedings of the ISPRS working group V/1, Panoramic Photogrammetry Workshop, vol. XXXIV, Part 5/W16, Dresden, Feb. 19-22.
Verdera et al., *Inpainting Surface Holes*, May 2, 2003.

*Primary Examiner*—Russell Frejd
(74) *Attorney, Agent, or Firm*—Allen, Dyer, Doppelt, Milbrath & Gilchrist, P.A.

(57) ABSTRACT

A geospatial modeling system may include a geospatial model database containing geospatial model data, a display, and a processor. The processor may cooperate with the geospatial model database and the display for determining a respective group of tree crown vegetation points from the geospatial model data for each tree of a plurality of trees, and for displaying a respective simulated tree trunk beneath each group of tree crown vegetation points. The processor may generate each simulated tree trunk to have a tree trunk height based upon heights of the respective group of tree crown vegetation points.

30 Claims, 6 Drawing Sheets

GEOSPATIAL MODELING SYSTEM PROVIDING SIMULATED TREE TRUNKS FOR GROUPS OF TREE CROWN VEGITATION POINTS AND RELATED METHODS

FIELD OF THE INVENTION

The present invention relates to the field of topographical modeling, and, more particularly, to geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

One difficulty in generating automated topographical models is generating realistic looking foliage, and particularly trees. This is because geospatial modeling data is often captured from above the geographical area of interest from an airplane or satellite, and thus the raw image data may not include data points corresponding to the trunks of trees, only the leaves/needles thereon. Thus, when a three-dimensional (3D) digital elevation model (DEM) of the scene is generated, it may only include the crowns of trees and not the trunks.

Various approaches have been used for attempting to determine the location and heights of tree trunks from collected image data. For example, in an article by Pyysalo et al. entitled "Reconstructing Tree Crowns from Laser Scanner Data for Feature Extraction," ISPRS Commission III, Symposium 2002 Sep. 9-13, 2002, Graz, Austria, 2002, a study to reconstruct single tree crowns from laser scanner data to use the obtained vector model for feature extraction is described. As part of the reconstruction methodology, an estimate of the location of the tree trunk was calculated from crown points as a mean value of x and y coordinates weighted with point height. The tree trunks were considered as straight lines from the top of the tree to the surface of the digital terrain model. This reference line was then used to help estimate an average distance of points from the trunk at different heights.

Despite the existence of such measuring techniques, it may be difficult to generate and display simulated tree trunks in a 3D DEM. This is because any automatic rendering of a tree trunk by a computer may be difficult for typical DEM tools without having any raw data points corresponding to the tree trunk. Yet, attempting to manually paint in tree trunks in a DEM may be extremely time consuming, and therefore untenable, for a geographical area of interest with more than a small number of trees.

SUMMARY OF THE INVENTION

In view of the foregoing background, it is therefore an object of the present invention to provide a system and related methods for generating and displaying simulated tree trunks for respective groups of tree crown vegetation points from geospatial model data.

This and other objects, features, and advantages are provided by a geospatial modeling system which may include a geospatial model database containing geospatial model data, a display, and a processor. More particularly, the processor cooperates with the geospatial model database and the display for determining a respective group of tree crown vegetation points from the geospatial model data for each tree of a plurality of trees, and for displaying a respective simulated tree trunk beneath each group of tree crown vegetation points. Also, the processor may generate each simulated tree trunk to have a tree trunk height based upon heights of the respective group of tree crown vegetation points.

More particularly, the processor may set the tree trunk height above ground to an average height of the respective group of tree crown vegetation points above ground. Furthermore, the processor may set the tree trunk width based upon a width of the respective group of tree crown vegetation points. For example, the processor may set the tree trunk width to a predetermined proportion of a tree crown width, or to a fixed value.

The processor may also display each tree crown vegetation point as a vegetation-colored body at its associated geospatial position. Similarly, the processor may also display the simulated tree trunk as stacked layers of trunk-colored bodies aligned along a vertical axis. By way of example, adjacent layers of trunk-colored bodies may be rotated relative to one another. Further, the processor may determine the respective group of tree crown vegetation points based upon applying a peak-finding window. The geospatial model data may be three-dimensional (3D) geospatial model data, such as 3D digital elevation model (DEM) data, for example.

A geospatial modeling method aspect may include determining a respective group of tree crown vegetation points from among a plurality of geospatial model data points for each tree of a plurality of trees using a processor. The method may further include displaying a respective simulated tree trunk beneath each group of tree crown vegetation points on a display by generating each simulated tree trunk to have a tree trunk height based upon heights of the respective group of tree crown vegetation points using the processor.

A computer-readable medium may include a geospatial model database module containing geospatial model data. Moreover, a processing module may cooperate with the geospatial model database and a display for determining a respective group of tree crown vegetation points from the geospatial model data for each tree of a plurality of trees, and for displaying a respective simulated tree trunk beneath each group of tree crown vegetation points. The processing module may also generate each simulated tree trunk to have a tree trunk height based upon heights of the respective group of tree crown vegetation points.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
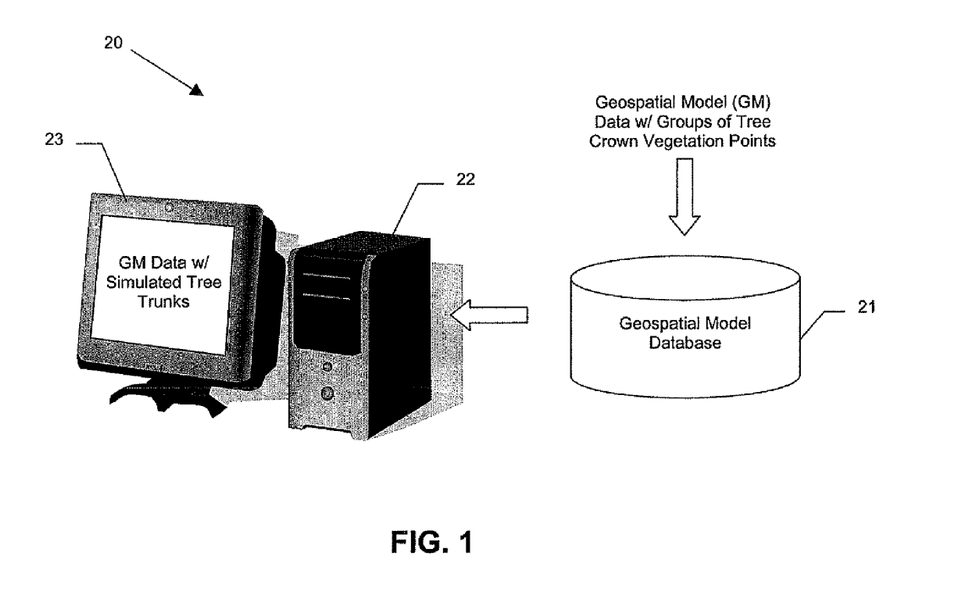
FIG. 1 is a schematic block diagram of a geospatial modeling system in accordance with the invention.
Figure 2:
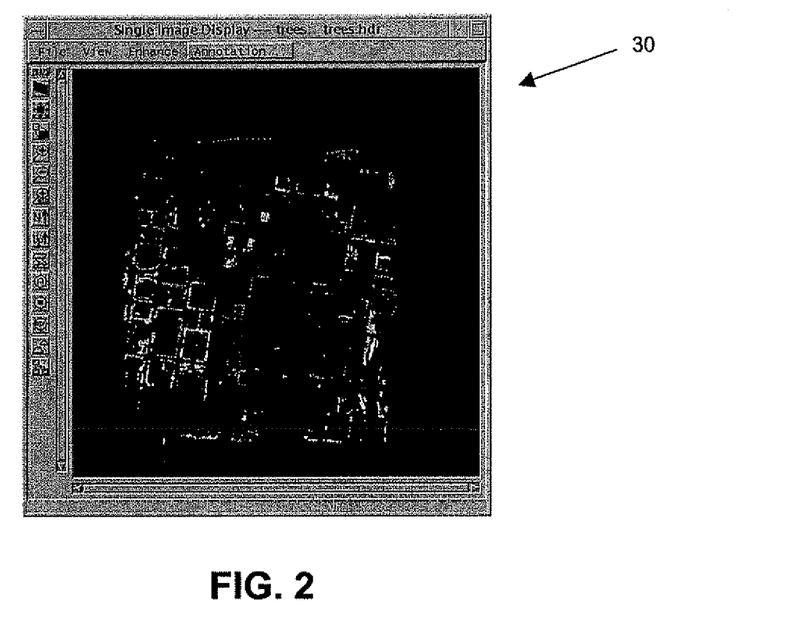
FIGS. 2 and 3 are, respectively, screen prints of geospatial image data before and after performing a windowing operation to determine tree trunk locations in accordance with the invention.

Referring initially to FIG. 1, a geospatial modeling system 20 illustratively includes a geospatial model database 21 and a processor 22 that may advantageously be used for generating and displaying simulated tree trunks for groups of tree crown vegetation points from geospatial model data contained in the geospatial model database. By way of example, the processor 22 may be a central processing unit (CPU) of a PC, Mac, or other computing workstation, for example. A display 23 may also be coupled to the processor 22 for displaying geospatial modeling data, as will be discussed further below. The processor 22 may be implemented using a combination of hardware and software components/modules to perform the various operations that will be discussed further below, as will be appreciated by those skilled in the art.

By way of example, geospatial data may be captured using various techniques such as stereo optical imagery, Light Detecting and Ranging (LIDAR), Interferometric Synthetic Aperture Radar (IFSAR), etc. Generally speaking, the data will be captured from overhead (e.g., nadir) views of the geographical area of interest by airplanes, satellites, etc., as will be appreciated by those skilled in the art. However, oblique images of a geographical area of interest may also be used in addition to (or instead of) the nadir images in some embodiments to add additional 3D detail to a geospatial model. The raw image data captured using LIDAR, etc., may be processed upstream from the geospatial model database 21 into a desired format, such as a digital elevation model (DEM), or this may be done by the processor 22.

Turning additionally to FIGS. 2 through 10, a geospatial modeling approach which may advantageously be used for generating and displaying simulated tree trunks, for example, using the system 20 is now described. Beginning at Block 100, geospatial model data, such as 3D DEN data, for example, is stored in the geospatial model database 21, at Block 102. Generally speaking, the geospatial model data will include "raw" data points collected by LIDAR, etc., that have position and elevation information association therewith that is geo-referenced to a corresponding geospatial position grid to provide the DEM. In certain embodiments, additional refinements to the DEM data may be performed, such as edge detection to sharpen building boundaries, texturing, etc., using tools such as RealSite® and the system set forth in U.S. Pat. No. 6,654,690, as discussed further above and will be appreciated by those skilled in the art.

Figure 3:
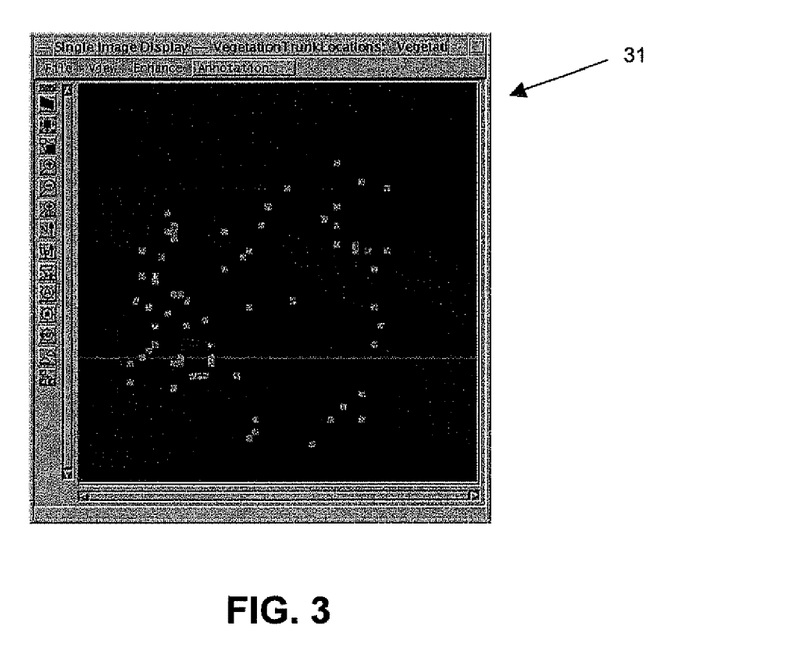
Figure 4:
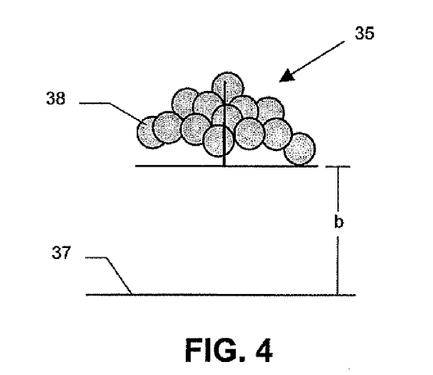
FIGS. 4 through 7 are schematic views illustrating generation of simulated tree trunk bodies in accordance with the invention.
Figure 5:
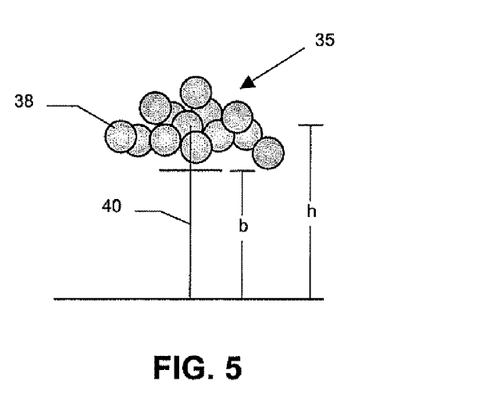
Figure 6:
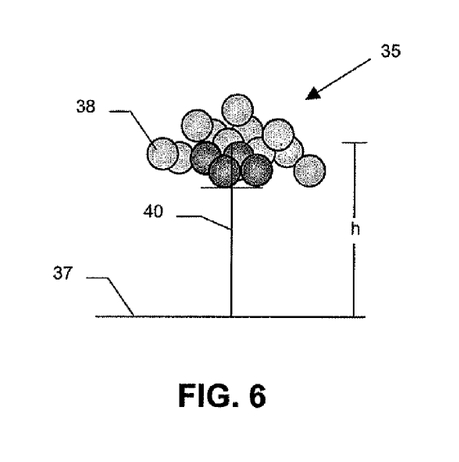
Figure 7:
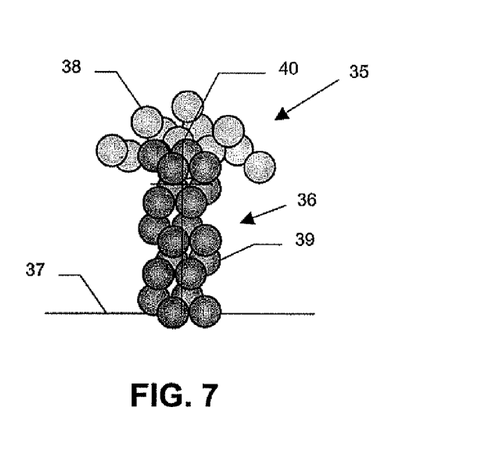

The processor 22 may then determine respective groups of tree crown vegetation points 35 for trees within the geospatial model data 30 based upon applying a peak-finding window, for example, at Block 102. More particularly, for each data point or post, the processor 22 compares the heights of adjacent posts within a predetermined window to find which vegetation (i.e., leaves/needles) points belong within a same group, and which point(s) within a respective group has the highest elevation, as will be appreciated by those skilled in the art. The highest point will correspond to the location of a trunk 36 for the tree that is represented by the tree crown vegetation points 35 (FIG. 7). Vegetation data 31 is thereby separated into contiguous block and matched with the trunk points, as seen in FIG. 3.

The vegetation data may be distinguished from other data, such as ground or building data, based upon a color of the collected data, where a color image collector is used, or by using other techniques known to those skilled in the art. By way of example, one particularly advantageous technique for distinguishing vegetation and cultural (e.g., building) features from ground in a DEM is set forth in the co-pending U.S. patent application entitled GEOSPATIAL MODELING SYSTEM FOR SEPARATING FOLIAGE DATA FROM BUILDING DATA BASED UPON NOISE FILTERING OPERATIONS AND RELATED METHODS, Ser. No. 11/463,353, which is also assigned to the present Assignee and is hereby incorporated herein in its entirety by reference.

The processor 22 then determines or sets a height h for each tree trunk 36 for each group of tree crown vegetation points 35, at Block 103. More particularly, the processor 22 generates each simulated tree trunk 36 to have a tree trunk height h based upon heights of the respective group of tree crown vegetation points. For example, the processor 22 may set the tree trunk 36 height h above ground 37 to an average height of the respective group of tree crown vegetation points 35 above ground.

To determine the average height h, the processor 22 may first determine a base height b, which corresponds to the base or bottom of the group of tree crown vegetation points 25 relative to the ground 37. The average height is then half-way between the base height b and the peak height of the group of tree crown vegetation points 25. The base height b may be determined based upon one or more outlying points on the edge of the group of tree crown vegetation points 25, as the image collector which captures the raw image data may not have a line of sight to vegetation points on the bottom of the middle of a tree, as will be appreciated by those skilled in the art. By making the height h of the trunk 36 an average height of the group of tree crown vegetation points 25, this advantageously makes the trunk extend into the vegetation of the tree, but remain below the top of the crown, as an actual tree trunk would appear. This adds to the realistic nature of the simulated tree trunk 36.

The processor 22 further sets the tree trunk 36 width based upon a width of the respective group of tree crown vegetation points 35, at Block 104. By way of example, this may be done as a predetermined proportion of a tree crown width. That is, the processor determines the width of a respective group of tree crown vegetation points 25 and sets the trunk width in proportion to a percentage of the crown width. Alternatively, the width of the tree trunk may simply be set to a fixed value. Other suitable approaches may also be used for setting the width of the tree trunk 36.

Once the location, height, and width of the tree trunk 36 are determined, the processor 22 may then generate and display a simulated tree trunk with its respective group of tree crown vegetation points 35. In particular, each tree crown vegetation point may be displayed as a vegetation-colored body 38 at its associated geospatial position, at block 105. In the illustrated example, the vegetation colored bodies 38 are spheres, and they may be colored a shade of green, for example. Of course, other vegetation body shapes and colors may be used.

Figure 10:
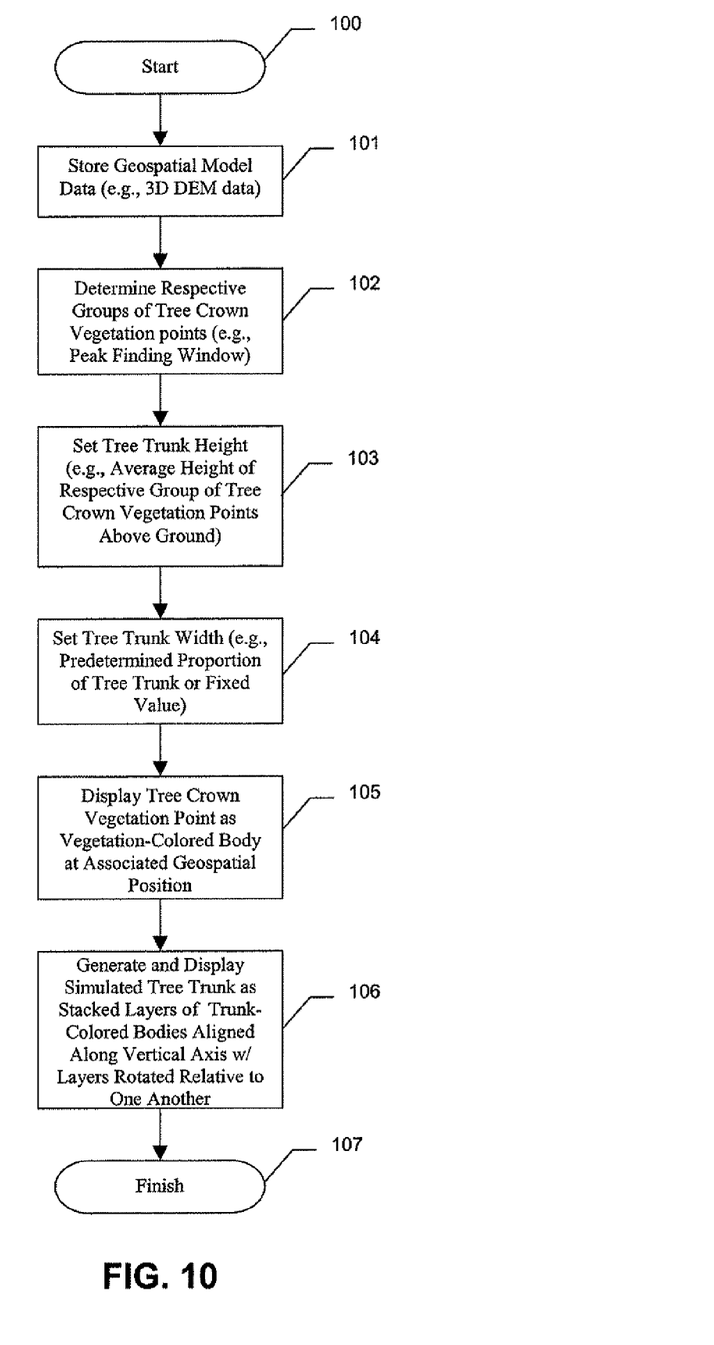
FIG. 10 is a flow diagram of a geospatial modeling method in accordance with the invention.

Similarly, the processor 22 may also display the simulated tree trunk 36 as stacked layers of trunk-colored bodies 39 aligned along a vertical axis 40, at Block 106, thus concluding the method illustrated in FIG. 10 (Block 107). By way of example, the trunk-colored bodies may also be spheres, and they may be colored a shade of brown, for example, although other shapes/colors may also be used. To provide a still further realistic look to the simulated tree trunks 36, adjacent layers of the trunk-colored bodies 39 may be rotated relative to one another. This gives the simulated tree trunk 36 a helical or corkscrew shape that may appear more realistic in some 3D geospatial models, as opposed to merely inserting a solid 3D object in place of the trunk, such as a cylinder or 3D rectangle, for example. Of course, in certain embodiments solid objects, lines, etc., may be used for the simulated tree trunks 36.

Figure 8:
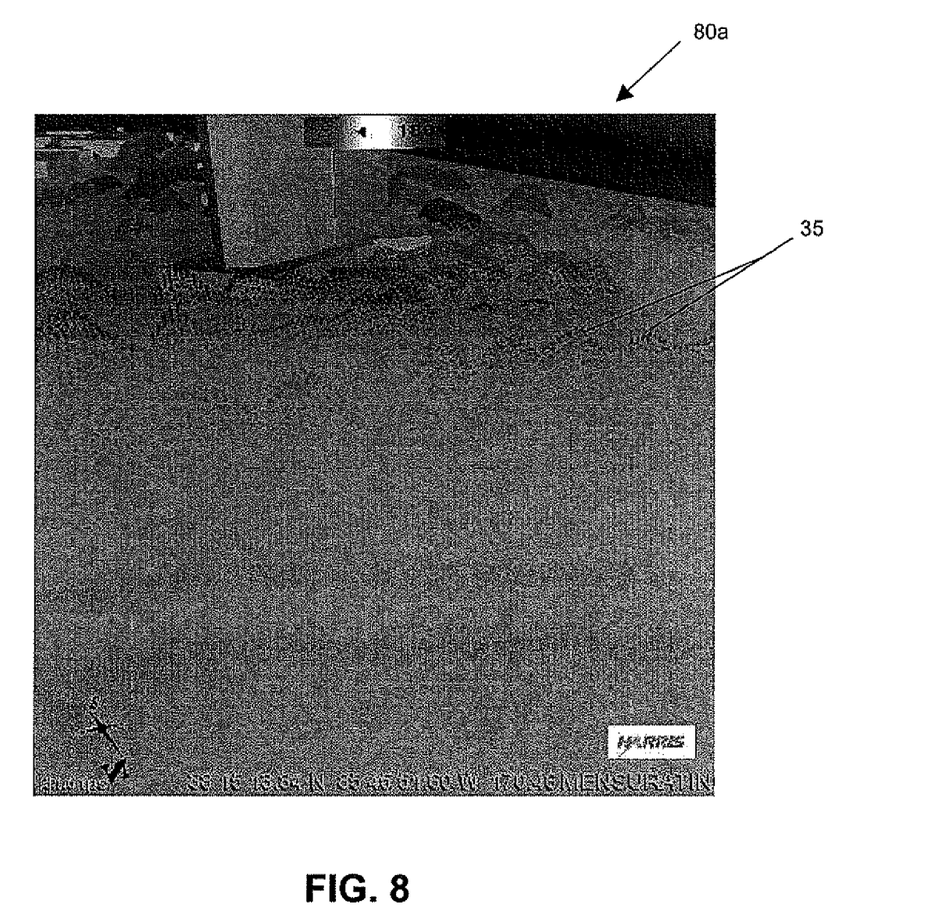
FIGS. 8 and 9 are, respectively, digital elevation model views before and after generating and displaying simulated tree trunks in accordance with the invention.
Figure 9:
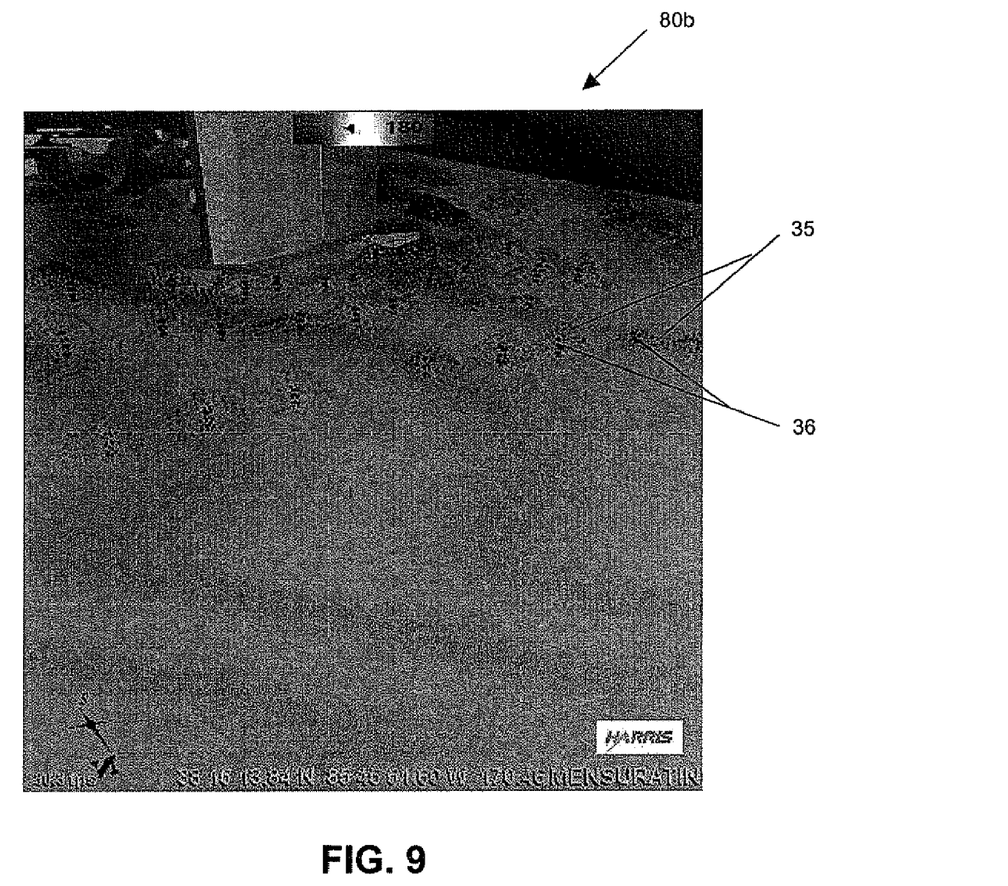

An exemplary display view of a DEM 80a including groups of tree crown vegetation points 35 without simulated tree trunks 36 is shown in FIG. 8, while the same DEM 80b including respective simulated tree trunks for the groups of tree crown vegetation points is shown in FIG. 9. As may be seen, the simulated trunks help a viewer to more readily identify the vegetation points 35 as tree vegetation, as opposed to bushes, etc. Moreover, the helical or "corkscrew" shape of the simulated tree trunks 36 helps prevent an unnatural "stilted" look of the trees.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
    a geospatial model database containing geospatial model data;
    a display; and
    a processor utilizing said geospatial model database and said display for determining a respective group of tree crown vegetation points from the geospatial model data for each tree of a plurality of trees, and for displaying a respective simulated tree trunk beneath each group of tree crown vegetation points;
    said processor generating each simulated tree trunk to have a tree trunk height based upon heights of the respective group of tree crown vegetation points.

2. The geospatial modeling system of claim 1 wherein said processor sets the tree trunk height above ground to an average height of the respective group of tree crown vegetation points above ground.

3. The geospatial modeling system of claim 1 wherein said processor sets the tree trunk width based upon a width of the respective group of tree crown vegetation points.

4. The geospatial modeling system of claim 3 wherein said processor sets the tree trunk width to a predetermined proportion of a tree crown width.

5. The geospatial modeling system of claim 1 wherein said processor sets the tree trunk width to a fixed value.

6. The geospatial modeling system of claim 1 wherein said processor displays each tree crown vegetation point as a vegetation-colored body at its associated geospatial position.

7. The geospatial modeling system of claim 1 wherein said processor displays the simulated tree trunk as stacked layers of trunk-colored bodies aligned along a vertical axis.

8. The geospatial modeling system of claim 7 wherein adjacent layers of trunk-colored bodies are rotated relative to one another.

9. The geospatial modeling system of claim 1 wherein said processor determines the respective group of tree crown vegetation points based upon applying a peak-finding window.

10. The geospatial modeling system of claim 1 wherein the geospatial model data comprises three-dimensional (3D) geospatial model data.

11. The geospatial modeling system of claim 10 wherein the 3D geospatial model data comprises digital elevation model (DEM) data.

12. A geospatial modeling system comprising:
    a geospatial model database containing geospatial model data;
    a display; and
    a processor utilizing said geospatial model database and said display for determining a respective group of tree crown vegetation points from the geospatial model data for each tree of a plurality of trees, and for displaying a respective simulated tree trunk beneath each group of tree crown vegetation points;
    said processor generating each simulated tree trunk to have a tree trunk height based upon heights of the respective group of tree crown vegetation points;
    said processor displaying each tree crown vegetation point as a vegetation-colored body at its associated geospatial position, and displaying the simulated tree trunk as stacked layers of trunk-colored bodies aligned along a vertical axis.

13. The geospatial modeling system of claim 12 wherein adjacent layers of trunk-colored bodies are rotated relative to one another.

14. The geospatial modeling system of claim 12 wherein said processor sets the tree trunk height above ground to an average height of the respective group of tree crown vegetation points above ground.

15. The geospatial modeling system of claim 12 wherein said processor sets the tree trunk width based upon a width of the respective group of tree crown vegetation points.

16. The geospatial modeling system of claim 12 wherein said processor sets the tree trunk width to a fixed value.

17. The geospatial modeling system of claim 12 wherein said processor determines the respective group of tree crown vegetation points based upon applying a peak-finding window.

18. The geospatial modeling system of claim 12 wherein the geospatial model data comprises three-dimensional (3D) geospatial model data.

19. A geospatial modeling method comprising:
   determining a respective group of tree crown vegetation points from among a plurality of geospatial model data points for each tree of a plurality of trees using a processor; and
   displaying a respective simulated tree trunk beneath each group of tree crown vegetation points on a display by generating each simulated tree trunk to have a tree trunk height based upon heights of the respective group of tree crown vegetation points using the processor.

20. The method of claim 19 wherein the processor sets the tree trunk height above ground to an average height of the respective group of tree crown vegetation points above ground.

21. The method of claim 19 wherein the processor sets the tree trunk width based upon a width of the respective group of tree crown vegetation points.

22. The method of claim 19 wherein the processor displays each tree crown vegetation point as a vegetation-colored body at its associated geospatial position.

23. The method of claim 19 wherein the processor displays the simulated tree trunk as stacked layers of trunk-colored bodies aligned along a vertical axis.

24. The method of claim 23 wherein adjacent layers of trunk-colored bodies are rotated relative to one another.

25. A computer-readable medium having computer-executable modules for performing computer-executable instructions and comprising:
   a geospatial model database module containing geospatial model data;
   a processing module utilizing the geospatial model database and a display for determining a respective group of tree crown vegetation points from the geospatial model data for each tree of a plurality of trees, and for displaying a respective simulated tree trunk beneath each group of tree crown vegetation points;
   the processor module generating each simulated tree trunk to have a tree trunk height based upon heights of the respective group of tree crown vegetation points.

26. The computer-readable medium of claim 25 wherein the processing module sets the tree trunk height above ground to an average height of the respective group of tree crown vegetation points above ground.

27. The computer-readable medium of claim 25 wherein the processing module sets the tree trunk width based upon a width of the respective group of tree crown vegetation points.

28. The computer-readable medium of claim 25 wherein the processing module displays each tree crown vegetation point as a vegetation-colored body at its associated geospatial position.

29. The computer-readable medium of claim 25 wherein the processing module displays the simulated tree trunk as stacked layers of trunk-colored bodies aligned along a vertical axis.

30. The computer-readable medium of claim 29 wherein adjacent layers of trunk-colored bodies are rotated relative to one another.

* * * * *